(12) United States Patent
Maruyama et al.

(10) Patent No.: US 7,766,420 B2
(45) Date of Patent: Aug. 3, 2010

(54) FRONT STRUCTURE OF VEHICLE BODY

(75) Inventors: Hiroto Maruyama, Toyota (JP); Naoya Kosaka, Susono (JP); Koji Tamakoshi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 372 days.

(21) Appl. No.: 11/795,377

(22) PCT Filed: Jan. 17, 2006

(86) PCT No.: PCT/JP2006/300919

§ 371 (c)(1),
(2), (4) Date: Jul. 17, 2007

(87) PCT Pub. No.: WO2006/075804

PCT Pub. Date: Jul. 20, 2006

(65) Prior Publication Data

US 2008/0150326 A1    Jun. 26, 2008

(30) Foreign Application Priority Data

Jan. 17, 2005    (JP)    ............................ 2005-009353

(51) Int. Cl.
*B62D 21/03*    (2006.01)
(52) U.S. Cl. .............. 296/203.02; 296/192; 296/193.09
(58) Field of Classification Search ........... 296/203.02, 296/193.09, 187.09, 192; 180/68.4
See application file for complete search history.

(56) References Cited

U.S. PATENT DOCUMENTS 4,717,198 A    1/1988 Komatsu (Continued)

FOREIGN PATENT DOCUMENTS

DE    3800296    7/1989

(Continued)

OTHER PUBLICATIONS

International Search Report.

(Continued)

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP

(57) ABSTRACT

The present invention aims at providing a vehicle body front-part structure which can efficiently disperse an impact load acting on the front part of a vehicle. In the vehicle body front-part structure in accordance with the present invention, a portion 6a of a radiator support supporting an upper part of a radiator arranged in the front part of a vehicle 2 is connected to a skeleton 9 of the vehicle body by a pair of first radiator support supporting members 4 which support it from both sides in the vehicle width direction, and second radiator support supporting members 11, 12 which are arranged on the inner side of the pair of first radiator support supporting members 4 in the vehicle width direction and support it from the backside. Therefore, at the time when vehicles collide, the impact load on the portion 6a of the radiator support supporting the upper part of the radiator can be transmitted to the skeleton 9 of the vehicle body through the first radiator support supporting members 4 and the second radiator support supporting members 11, 12 which are arranged on the inner side of the first radiator support supporting members 4 in the vehicle width direction, so as to be dispersed efficiently.

12 Claims, 8 Drawing Sheets

U.S. PATENT DOCUMENTS

| | | | | |
|---|---|---|---|---|
| 5,031,958 | A * | 7/1991 | Fujita et al. | 296/203.02 |
| 5,102,164 | A * | 4/1992 | Fujinaka et al. | 280/788 |
| 5,271,473 | A * | 12/1993 | Ikeda et al. | 180/68.4 |
| 5,348,114 | A * | 9/1994 | Yamauchi | 180/291 |
| 6,375,252 | B1 * | 4/2002 | Cheron et al. | 296/203.02 |
| 6,540,284 | B2 * | 4/2003 | Miyata | 296/203.02 |
| 6,672,652 | B2 * | 1/2004 | Takeuchi et al. | 296/193.09 |
| 6,729,008 | B2 * | 5/2004 | Nishijima | 29/458 |
| 6,729,424 | B2 * | 5/2004 | Joutaki et al. | 180/68.4 |
| 6,805,400 | B2 * | 10/2004 | Bruderick et al. | 296/193.09 |
| 6,893,081 | B2 * | 5/2005 | Sasano et al. | 296/203.02 |
| 7,052,076 | B2 * | 5/2006 | Kim | 296/187.09 |
| 7,210,733 | B2 * | 5/2007 | Mouch et al. | 296/203.02 |
| 7,219,954 | B2 * | 5/2007 | Gomi et al. | 296/203.02 |
| 7,267,394 | B1 * | 9/2007 | Mouch et al. | 296/203.02 |
| 7,270,368 | B2 * | 9/2007 | Aonuma et al. | 296/203.02 |
| 7,331,413 | B2 * | 2/2008 | Okai et al. | 180/68.4 |
| 7,347,489 | B2 * | 3/2008 | Ziaja et al. | 296/193.03 |

FOREIGN PATENT DOCUMENTS

| | | |
|---|---|---|
| DE | 103 24 000 | 12/2004 |
| EP | 1 454 815 | 9/2004 |
| JP | A49-126017 | 12/1974 |
| JP | 62-58260 | 4/1987 |
| JP | U 1-83676 | 6/1989 |
| JP | U 3-59275 | 6/1991 |
| JP | 4-154487 | 5/1992 |
| JP | 11-43071 | 2/1999 |
| JP | 2001-058580 | 3/2001 |
| JP | 2002-002538 | 1/2002 |
| JP | 2003-118640 | 4/2003 |
| JP | 2004-106705 | 4/2004 |

OTHER PUBLICATIONS

Japanese Office Action.
International Search Report for PCT/JP2006/300919.
Supplementary European Search Report dated Aug. 27, 2008.
Communication from the European Patent Office for EP 06 712 135 dated Aug. 10, 2009.

* cited by examiner

FRONT STRUCTURE OF VEHICLE BODY

TECHNICAL FIELD

The present invention relates to a front-part structure of a vehicle body.

BACKGROUND ART

Front-part structures of vehicle bodies in various vehicles such as passenger cars have conventionally employed structures for absorbing shocks at the time of collisions with other vehicles. Known as this kind of vehicle body front-part structure is one in which an upper end part of a radiator support supporting a peripheral part of a radiator is supported in a vehicle width direction by an apron upper member constituting an upper part of an outer frame of an engine room (see, for example, Japanese Patent Application Laid-Open No. HEI 11-43071).

DISCLOSURE OF THE INVENTION

Here, it has recently been desired to disperse the impact load. Therefore, it has been demanded to disperse the impact load in the vehicle front part more efficiently than the prior art described in the above-mentioned laid-open patent publication does.

For solving such a problem, it is an object of the present invention to provide a vehicle body front-part structure which can efficiently disperse the impact load acting on a front part of a vehicle.

The vehicle body front-part structure in accordance with the present invention is a front-part structure of a vehicle body whose skeleton is partly constructed by a pair of front pillars, arranged on both sides of a vehicle width direction in a vehicle, forming a front part of a passenger compartment of the vehicle; the front-part structure comprising a radiator support which supports a radiator; a pair of first radiator support supporting members which support a portion of the radiator support supporting an upper part of the radiator from both sides in the vehicle width direction and connect the portion to the front pillars; and a pair of second radiator support supporting members which are arranged on the inner side than the pair of first radiator support supporting members in the vehicle width direction, support the backside portion of the radiator support supporting the upper part of the radiator from the backside, and connect the portion to the skeleton of the vehicle body.

In the vehicle body front-part structure in accordance with the present invention, the portion of the radiator support supporting the upper part of the radiator arranged in the vehicle front part is connected to the skeleton of the vehicle body by a pair of first radiator support supporting members supporting it from both sides in the vehicle width direction and second radiator support supporting members, arranged on the inner side than the pair of first radiator support supporting members in the vehicle width direction, supporting it from the backside. Therefore, at the time when vehicles collide, the impact load on the portion of the radiator support supporting the upper part of the radiator is transmitted to the skeleton of the vehicle body through the first radiator support supporting members and the second radiator support supporting members arranged on the inner side than the first radiator support supporting members in the vehicle width direction, so as to be dispersed efficiently. Also, the second radiator support supporting members arranged on the inner side than the first radiator support supporting members in the vehicle width direction shorten the support point distance, thereby reducing the bending moment acting on the portion of the radiator support supporting the upper part of the radiator, by which the structure can endure a higher impact load than before.

When a cowl part connecting front parts of the pair of front pillars to each other is provided while the second radiator support supporting members are connected to the cowl part here, the impact load on the portion of the radiator support supporting the upper part of the radiator is transmitted to the cowl part through the second radiator support supporting members, so as to be dispersed efficiently to the skeleton of the vehicle body.

The structure may comprise a cowl supporting member which connects a portion supporting the second radiator support supporting members in the cowl part to the front pillars. In such a structure, the impact load on the portion of the radiator support supporting the upper part of the radiator is transmitted to the cowl part through the second radiator support supporting members, and to the front pillars through the cowl supporting member, so as to be dispersed efficiently to the skeleton of the vehicle body.

When a cowl part connecting front parts of the pair of front pillars to each other and a dash panel, connected to the cowl part, constituting a front wall of the passenger compartment are provided while the second radiator support supporting members are connected to the dash panel, the impact load on the portion of the radiator support supporting the upper part of the radiator is transmitted to the dash panel through the second radiator support supporting members, so as to be dispersed efficiently to the skeleton of the vehicle body.

The structure may comprise a dash panel supporting member which connects a portion connecting the second radiator support supporting members in the dash panel to the cowl part. In such a structure, the impact load on the portion of the radiator support supporting the upper part of the radiator is transmitted to the dash panel through the second radiator support supporting members, and to the front pillars through the dash panel supporting member, so as to be dispersed efficiently to the skeleton of the vehicle body.

When the second radiator support supporting members are connected to the skeleton of the vehicle body through an additional member arranged between the radiator support and cowl part in a front-to-rear direction of the vehicle, the operations mentioned above are effectively performed, while the individual members constituting the second radiator support supporting members can be made shorter, by which the structure can endure a higher impact load than before. This also improves the degree of freedom in arranging the second radiator support supporting members.

When the additional member is a suspension tower which supports a shock absorber used in a suspension on the vehicle body side, the impact load on the portion of the radiator support supporting the upper part of the radiator is transmitted through the second radiator support supporting members and suspension tower, so as to be dispersed efficiently to the skeleton of the vehicle body, while the individual members constituting the second radiator support supporting members can be made shorter, by which the structure can endure a higher impact load than before. This also improves the degree of freedom in arranging the second radiator support supporting members.

Also, the vehicle body front-part structure in accordance with the present invention is a front-part structure of a vehicle body whose skeleton is partly constructed by a pair of front pillars, arranged on both sides of a vehicle width direction in a vehicle, forming a front part of a passenger compartment of the vehicle; and a floor tunnel, formed in a lower face of the passenger compartment, extending in a front-to-rear direction of the vehicle; the front-part structure comprising a radiator support which supports a radiator; a pair of first radiator support supporting members which support a portion of the radiator support supporting an upper part of the radiator from both sides in the vehicle width direction and connect the portion to the front pillars; and a pair of second radiator support supporting members which are arranged on the inner side than the pair of first radiator support supporting members in the vehicle width direction and between the portion of the radiator support supporting the upper part of the radiator and the floor tunnel in the front-to-rear direction of the vehicle; wherein the second radiator support supporting members are arranged such as to hold an engine therebetween.

In such a vehicle body front-part structure, the impact load on the portion of the radiator support supporting the upper part of the radiator is transmitted through the first radiator support supporting members, second radiator support supporting members, and engine, so as to be dispersed efficiently to the skeleton of the vehicle body, while the individual members constituting the second radiator support supporting members can be made shorter, by which the structure can endure a higher impact load than before. This also improves the degree of freedom in arranging the second radiator support supporting members. Also, the second radiator support supporting members arranged on the inner side than the first radiator support supporting members in the vehicle width direction shorten the support point distance, thereby reducing the bending moment acting on the portion of the radiator support supporting the upper part of the radiator, by which the structure can endure a higher impact load than before.

BEST MODES FOR CARRYING OUT THE INVENTION

Figure 1:
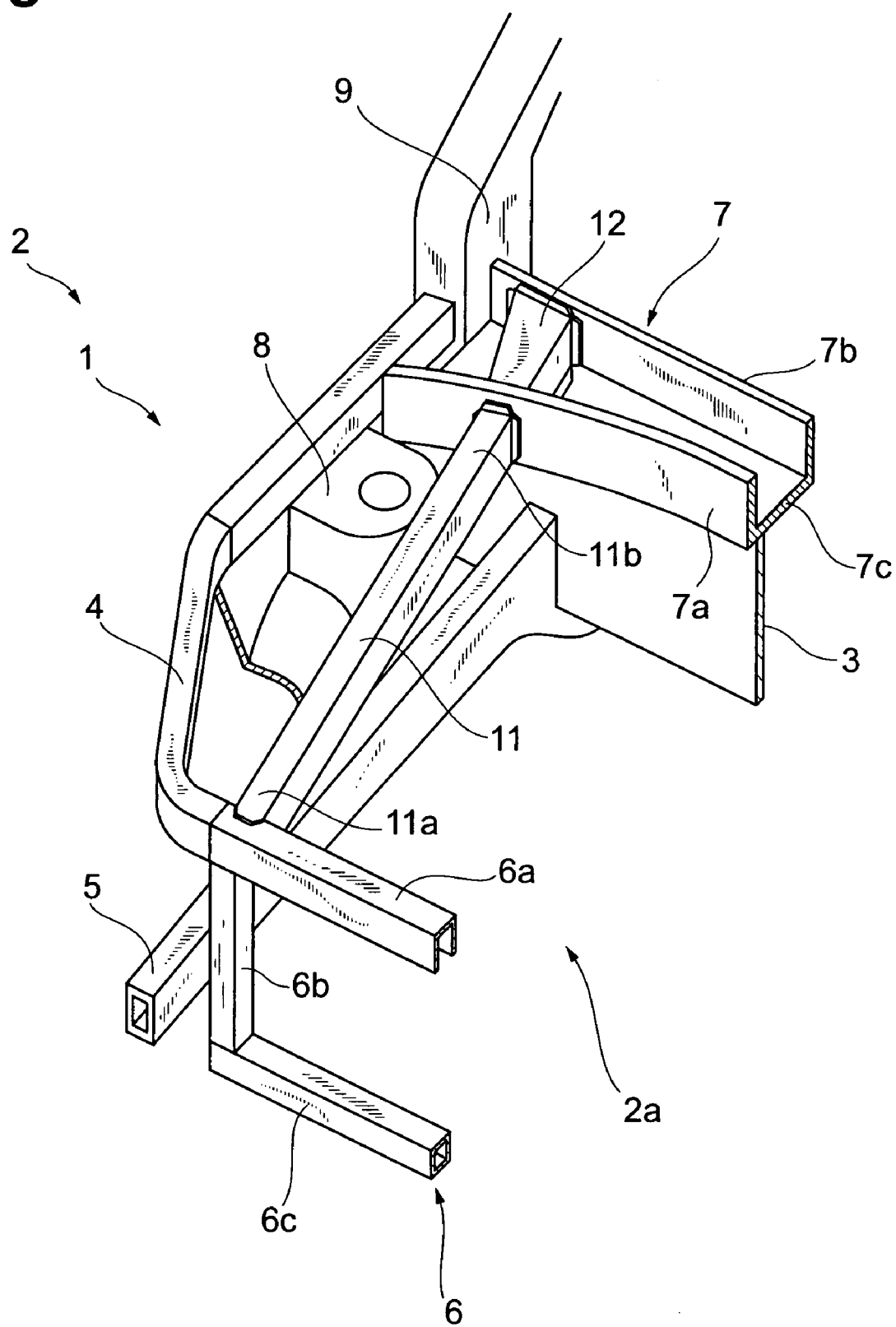
FIG. 1 is a perspective view showing the vehicle body front-part structure in accordance with a first embodiment of the present invention from the front side.
Figure 2:
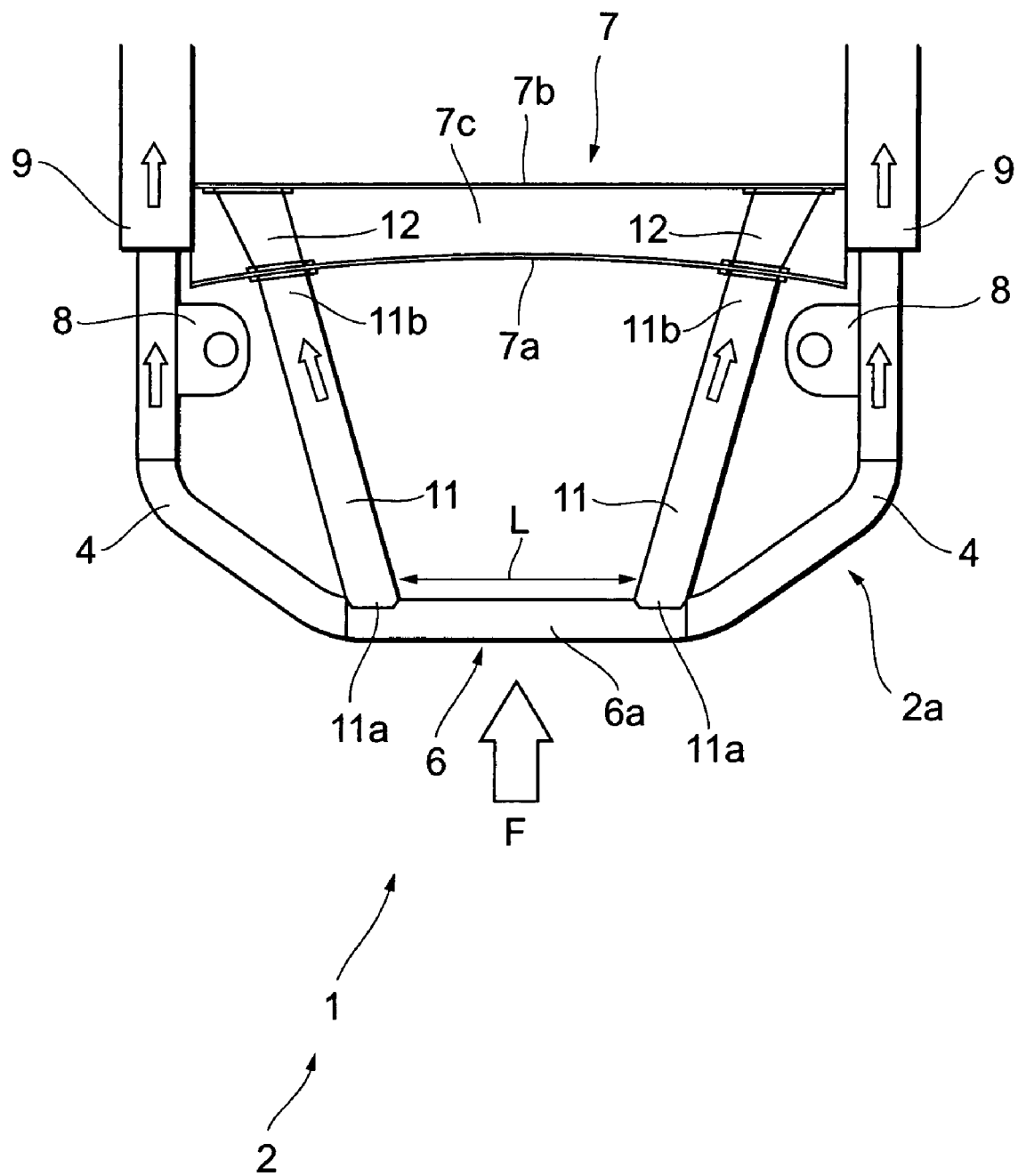
FIG. 2 is a plan view of the vehicle body front-part structure shown in FIG. 1.

In the following, preferred embodiments of the vehicle body front-part structure in accordance with the present invention will be explained with reference to the drawings. FIG. 1 is a perspective view showing the vehicle body front-part structure in accordance with the first embodiment of the present invention from the front side, whereas FIG. 2 is a plan view of the vehicle body front-part structure shown in FIG. 1. In the explanation of the drawings, the same or equivalent constituents will be referred to with the same numerals while omitting their overlapping descriptions. In the specification, while the front-side direction at the time when the vehicle moves straightforward is defined as "front side", words indicating directions such as "front", "rear", "left", and "right" will be used.

The vehicle body front-part structure 1 shown in FIGS. 1 and 2 is a vehicle body front-part structure of a vehicle 2 such as passenger car, for example. The vehicle 2 has a front part equipped with an engine room 2a, behind which a passenger compartment is formed with a dash panel 3 acting as a partition. FIG. 1 illustrates only the right side.

As shown in FIG. 1, the vehicle body front-part structure 1 comprises a radiator support 6 which is arranged in the front part of the engine room 2a and supports a radiator, an apron upper member (first radiator support supporting member) 4 which constitutes an upper part of a frame of the engine room 2a, a pair of front side members (only one of which is illustrated) 5 which are arranged on both sides in the vehicle width direction while holding the engine therebetween and extend in the front-to-rear direction, and a cowl part 7 which is arranged on the upper side of the dash panel 3 and extends in the vehicle width direction.

The radiator support 6, which constitutes a rectangular frame, has a radiator support upper (a portion of the radiator support supporting the upper part of the radiator) 6a which extends in the vehicle width direction, so as to support the upper end part of the radiator; a pair of radiator support sides 6b which extend in the vehicle height direction, such that their upper end parts are connected to end parts of the radiator support upper 6a, so as to support side parts of the radiator; and a radiator support lower 6c which extends in the vehicle width direction, such that both end parts are connected to the lower end parts of the radiator support sides 6b, so as to support the lower end part of the radiator; and accommodates the radiator within the frame constituted by the radiator support upper 6a, radiator support sides 6b, and radiator support lower 6c. The radiator support upper 6a is supported by the pair of apron upper members 4 from both sides in the vehicle width direction. Though forming a rectangular frame, the radiator support 6 may have a structure lacking the radiator support lower 6c and radiator support sides 6b.

The apron upper members 4 are arranged on both left and right sides of the vehicle 2 and extend in the front-to-rear direction thereof, while the front parts of the apron upper members 4 are bent to the inner side in the vehicle width direction, so as to be connected to the radiator support upper 6a as mentioned above. On the other hand, the rear end sides of the apron upper members 4 are connected to front body pillar upper reinforcements (front pillars, which will hereinafter be referred to as A-pillars) 9 which are a part of skeleton members of the vehicle body and form the front part of the passenger compartment. Suspension towers 8 which support the upper part of shock absorbers, which are used for suspensions, on the vehicle body side are provided on the inner side of the apron upper members 4 in the vehicle width direction. The suspension towers 8 project in the vehicle width direction from the apron upper members 4 to the engine room 2a side, each having a substantially tubular form extending in the vehicle height direction and covering a shock absorber from the engine room 2a side, so as to have a structure which hangs the shock absorber.

The front side members 5, which are a part of the skeleton members of the vehicle body, have front parts connected to the radiator support sides 6b, extend in the front-to-rear direction of the vehicle 2, so as to be connected to the front face of the dash panel 3, and are bent downward from the front face side of the dash panel 3, so as to extend to the lower face side of the floor panel of the passenger compartment. The front side members 5 are members for improving the strength and rigidity of the vehicle body and absorbing shocks which have not completely been absorbed by the front part of the vehicle 2 such as bumper, and have a predetermined deformation load.

The cowl part 7 is connected to the upper end of the dash panel 3 and extends in the vehicle width direction, while both end parts of the cowl part 7 are connected to the pair of A-pillars 9. The cowl part 7 has a front wall 7a and a rear wall 7b which are erected in the vehicle height direction, a bottom plate 7c connecting the lower end parts of the front wall 7a and rear wall 7b to each other, and an upper plate connecting the upper end parts of the front wall 7a and rear wall 7b to each other (the state without the upper plate being depicted), and supports the front glass from the lower side, while being utilized as an air supply path to an air conditioner.

Here, the vehicle body front-part structure 1 in accordance with this embodiment comprises a pair of reinforcement members which are arranged on the inner side than the pair of apron upper members 4 in the vehicle width direction and support the radiator support upper 6a from the backside, so as to connect it to the front wall 7a of the cowl part 7, and cowl bulks 12 which connect the portions supporting the first reinforcement members in the front wall 7a of the cowl part 7 to the rear wall 7b of the cowl part 7. The first reinforcement members 11 and cowl bulks 12 constitute second radiator support supporting members.

The first reinforcement members 11 extend substantially horizontally in the front-to-rear direction of the vehicle 2, and support the radiator support upper 6a from the backside. Specifically, the front end parts 11a of the first reinforcement members 11 are connected to the radiator support upper 6a on the inner side than the support points by the apron upper members 4 in the vehicle width direction. On the other hand, the rear end parts 11b of the first reinforcement members 11 are connected to the front face of the front wall 7a of the cowl part 7. The first reinforcement members 11 may be connected to the radiator support upper 6a and cowl part 7 either by welding or with bolts and the like.

The cowl bulks 12 are reinforcement members interposed between the front wall 7a and rear wall 7b of the cowl part 7. The front end parts of the cowl bulks 12 are connected to the portions corresponding to the rear end parts 11b of the first reinforcement members 11 in the front wall 7a of the cowl part 7, whereas the rear end parts of the cowl bulks 12 are connected to the rear wall 7b of the cowl part 7. The cowl bulks 12 may be connected to the front wall 7a and rear wall 7b of the cowl part 7 either by welding or with bolts and the like.

In thus constructed vehicle body front-part structure 1, when the vehicle 2 collides with an obstacle such as another vehicle on the front side of the vehicle 2, for example, a load F acts on the radiator support upper 6a from the front side, and the load F acting on the radiator support upper 6a is transmitted to the apron upper members 4 and first reinforcement members 11. The load transmitted to the apron upper members 4 is transmitted to the A-pillars 9, so as to be dispersed to the skeleton members of the vehicle body. On the other hand, the load transmitted to the first reinforcement members 11 is transmitted to the cowl part 7, cowl bulks 12, and A-pillars 9, so as to be dispersed to the skeleton members of the vehicle body. Thus, the vehicle body front-part structure 1 of this embodiment efficiently disperses the impact load on the radiator support upper 6a to the skeleton of the vehicle body. Also, the first reinforcement members 11 arranged on the inner side than the apron upper members 4 shorten the support point distance L, so as to reduce the bending moment acting on the radiator support upper 6a, whereby the structure can endure a higher impact load than before.

Though the second radiator supporting member in the above-mentioned first embodiment is constructed such that the first reinforcement member 11 and cowl bulk 12 are provided as separate members and connected to each other while holding the front wall 7a of the cowl part 7 therebetween, the first reinforcement member 11 and cowl bulk 12 may be provided as a unit penetrating through the front wall 7a of the cowl part 7. Though the first embodiment employs the cowl bulks 12 as a particularly preferred structure, a structure comprising the first reinforcement members 11 alone may also be used.

Figure 3:
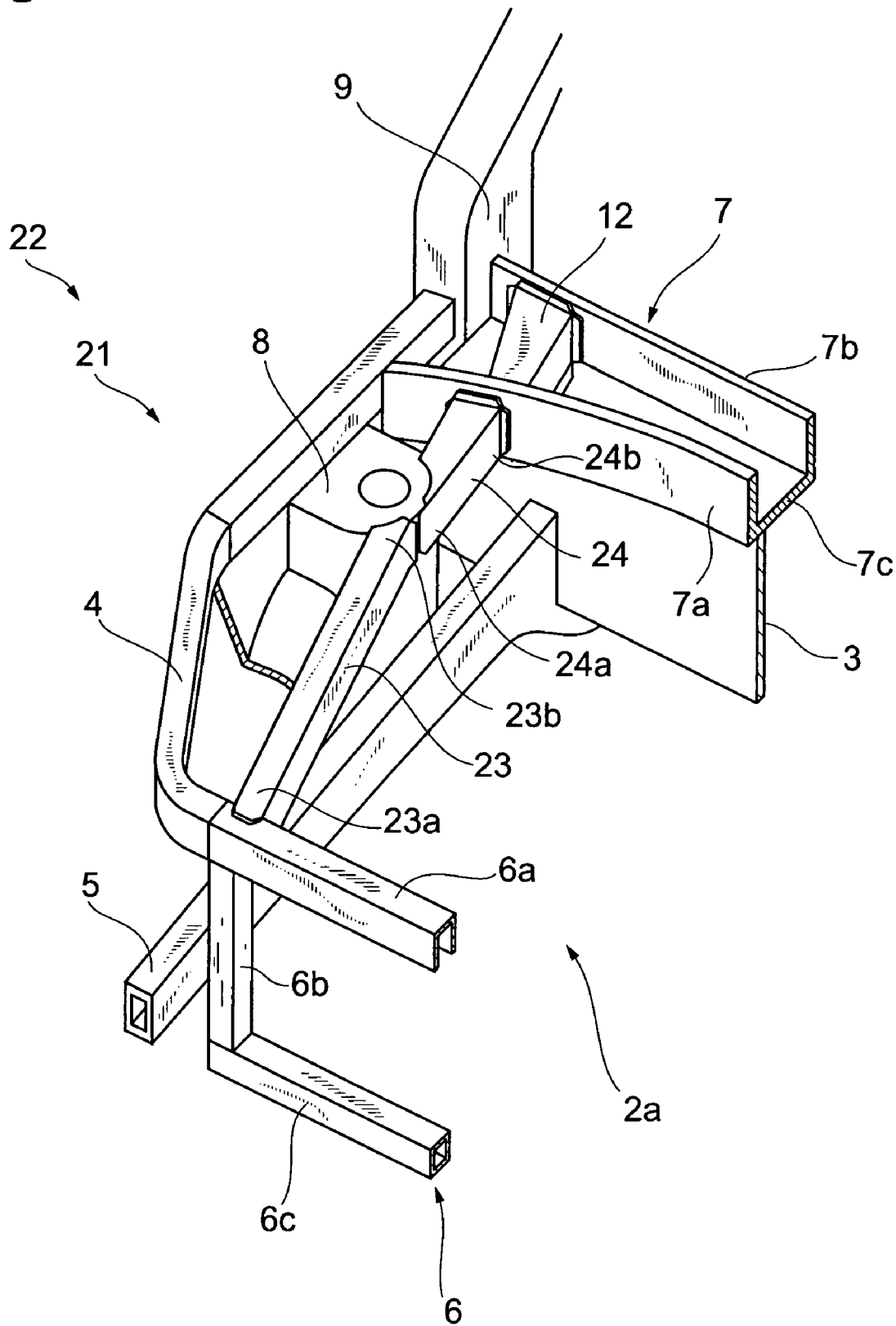
FIG. 3 is a perspective view showing the vehicle body front-part structure in accordance with a second embodiment of the present invention from the front side.
Figure 4:
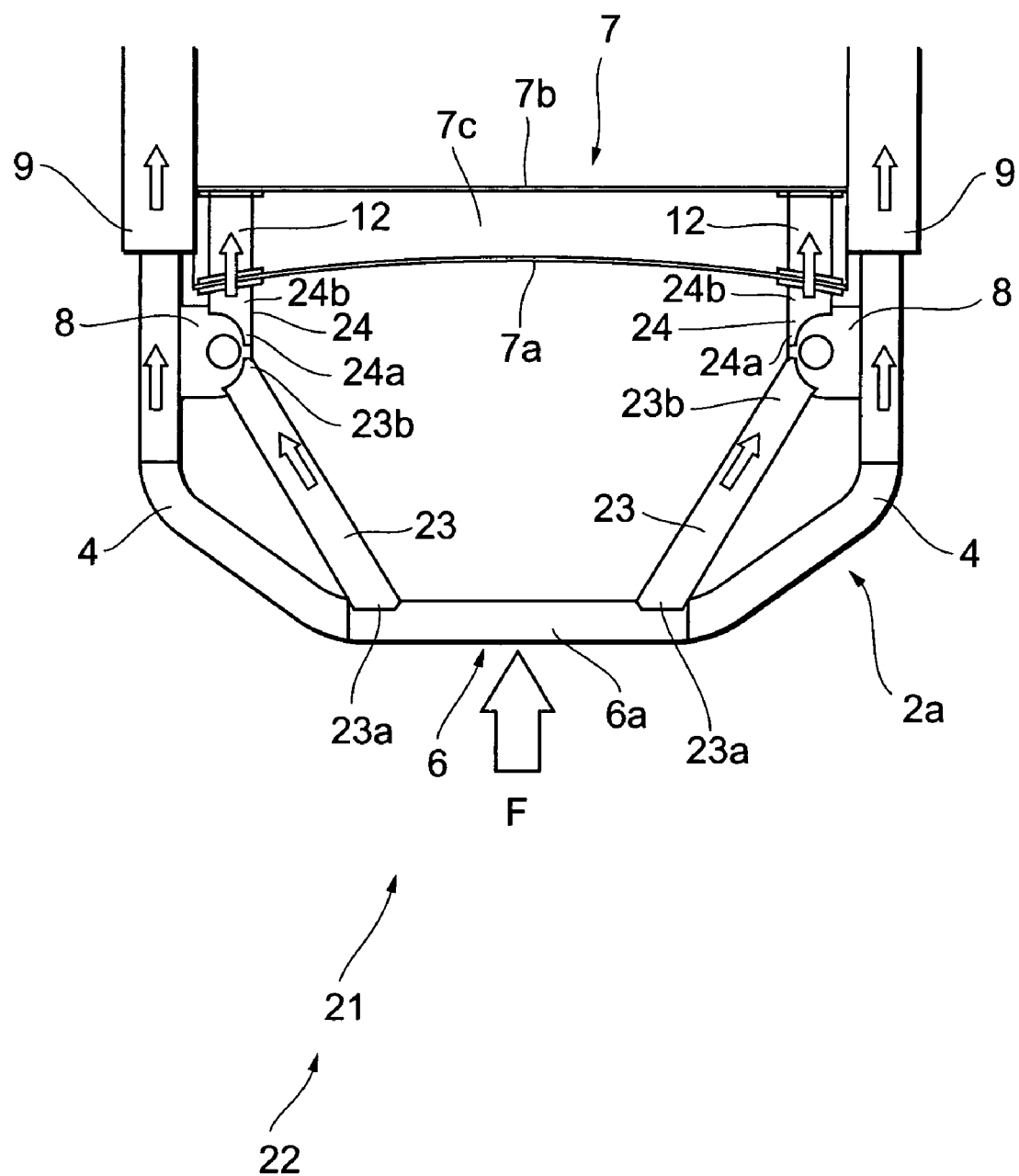
FIG. 4 is a plan view of the vehicle body front-part structure shown in FIG. 3.

The vehicle body front-part structure in accordance with the second embodiment of the present invention will now be explained with reference to FIGS. 3 and 4. The vehicle body front-part structure 21 in accordance with the second embodiment differs from the vehicle body front-part structure 1 in accordance with the first embodiment in that second reinforcement members 23 and third reinforcement members 24 which connect the radiator support upper 6a and the cowl part 7 to each other are used in place of the first reinforcement members 11 connecting the radiator support upper 6a and the cowl part 7 to each other. The second reinforcement members 23, third reinforcement members 24, and cowl bulks 12 constitute second radiator support supporting members.

The second reinforcement members 23 extend substantially horizontally in the front-to-rear direction of a vehicle 22, and support the radiator support upper 6a from the backside. Specifically, the front end parts 23a of the second reinforcement members 23 are connected to the inner side of the radiator support upper 6a in the vehicle width direction. On the other hand, the rear end parts 23b of the second reinforcement members 23 are connected to the front side of the upper parts of the suspension towers 8 on the inner side in the vehicle width direction. The second reinforcement members 23 may be connected to the radiator support upper 6a and suspension towers 8 either by welding or with bolts and the like.

The third reinforcement members 24 extend substantially horizontally in the front-to-rear direction of the vehicle 22, and support the radiator support upper 6a from the backside through the suspension towers 8 and second reinforcement members 23. Specifically, the front end parts 24a of the third reinforcement members 24 are connected to the rear side of the upper parts of the suspension towers 8 on the inner side in the vehicle width direction. On the other hand, the rear end parts 24b of the third reinforcement members 24 are connected to the front face of the front wall 7a of the cowl part 7. The third reinforcement members 24 may be connected to the suspension towers 8 and cowl part 7 either by welding or with bolts and the like.

As in the first embodiment, the cowl bulks 12 are reinforcement members interposed between the front wall 7a and rear wall 7b of the cowl part 7. The front end parts of the cowl bulks 12 are connected to the portions corresponding to the rear end parts 24b of the third reinforcement members 24 in the front wall 7a of the cowl part 7, whereas the rear end parts of the cowl bulks 12 are connected to the rear wall 7b of the cowl part 7. The cowl bulks 12 may be connected to the front wall 7a and rear wall 7b of the cowl part 7 either by welding or with bolts and the like.

In thus constructed vehicle body front-part structure 21, when the vehicle 22 collides with an obstacle such as another vehicle on the front side of the vehicle 22, for example, the load F (see FIG. 4) acting on the radiator support upper 6a is transmitted to the apron upper members 4 and second reinforcement members 23. The load transmitted to the apron upper members 4 is transmitted to the A-pillars 9, so as to be dispersed to the skeleton members of the vehicle body. On the other hand, the load transmitted to the second reinforcement members 23 is transmitted to the third reinforcement members 24 through the suspension towers 8, whereas the load transmitted to the third reinforcement members 24 is transmitted to the cowl part 7, cowl bulks 12, and A-pillars 9, so as to be dispersed to the skeleton members of the vehicle body.

Such a vehicle body front-part structure 21 can also yield effects similar to those of the vehicle body front-part structure 1 in accordance with the first embodiment. In addition, since the second reinforcement members 23 and third reinforcement members 24 connecting the radiator support upper 6a and cowl part 7 to each other through the suspension towers 8 are provided, the individual members 23, 24 constituting the second radiator support supporting members can be made shorter, by which the structure can endure a higher impact load than before. Also, the degree of freedom in arranging the second radiator support supporting members is improved.

Though the above-mentioned second embodiment names the suspension towers 8 as additional members, so as to yield the vehicle body front-part structure 21 for connecting the radiator support upper 6a and the skeleton members of the vehicle body to each other through the suspension towers 8, a vehicle front-part structure connecting the radiator support upper 6a and the skeleton members of the vehicle body to each other through other members arranged between the radiator support 6 and cowl part 7 in the front-to-rear direction of the vehicle 22 may be provided.

Figure 5:
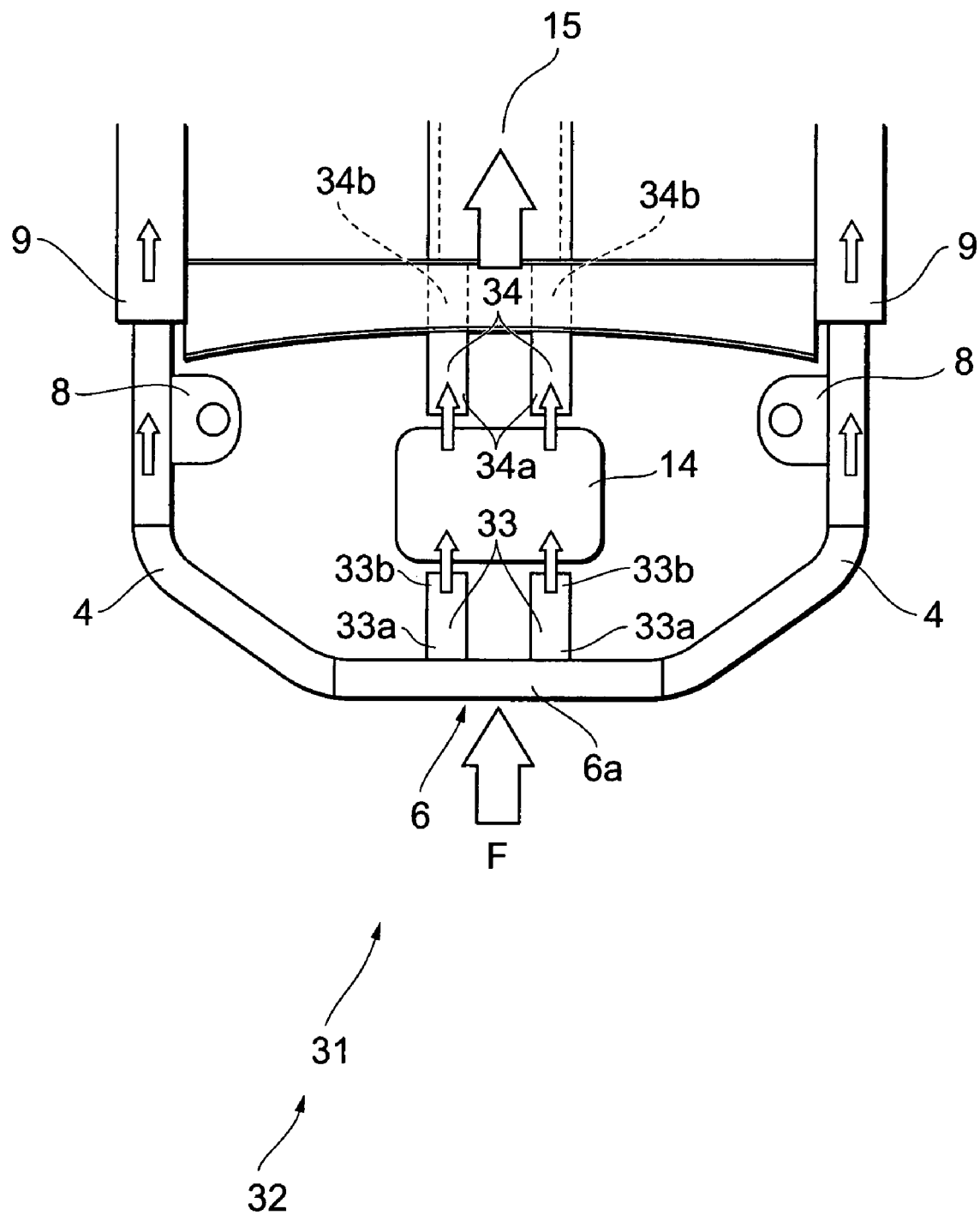
FIG. 5 is a plan view showing the vehicle body front-part structure in accordance with a third embodiment of the present invention.

The vehicle body front-part structure in accordance with the third embodiment of the present invention will now be explained with reference to FIG. 5. The vehicle body front-part structure 31 in accordance with the third embodiment differs from the vehicle body front-part structure 1 in accordance with the first embodiment in that it uses fourth reinforcement members 33 and fifth reinforcement members 34 which hold an engine 14 therebetween and are arranged between the radiator support upper 6a and a floor tunnel 15, which is a part of the skeleton members of the vehicle body, in place of the first reinforcement members 11 connecting the radiator support upper 6a and cowl part 7 to each other. The fourth reinforcement members 33 and fifth reinforcement members 34 constitute second radiator support supporting members.

Here, the floor tunnel 15 is formed by a floor panel constituting the lower part of the passenger compartment, and extends in the front-to-rear direction of a vehicle 32 at the center in the vehicle width direction.

The fourth reinforcement members 33 extend substantially horizontally in the front-to-rear direction of the vehicle 32, and transmit the impact load F from the front side acting on the radiator support upper 6a to the engine 14 on the backside. Specifically, the front end parts 33a of the fourth reinforcement members 33 are connected to the inner side of the radiator support upper 6a in the vehicle width direction, whereas the rear end parts 33b of the reinforcement members 33 extend toward the front face of the engine 14. The fourth reinforcement members 33 may be connected to the radiator support upper 6a either by welding or with bolts and the like.

The fifth reinforcement members 34 extend substantially horizontally in the front-to-rear direction of the vehicle 32, and transmit the impact load F from the front side acting on the engine 14 to the floor tunnel 15 on the backside. Specifically, the front end parts 34a of the fifth reinforcement members 34 are arranged so as to oppose the rear face of the engine 14, whereas the rear end parts 34b of the fifth reinforcement members 34 are connected to the floor tunnel 15. The fifth reinforcement members 34 may be connected to the floor tunnel 15 either by welding or with bolts and the like.

In thus constructed vehicle body front-part structure 31, when the vehicle 32 collides with an obstacle such as another vehicle on the front side of the vehicle 32, for example, the load F acting on the radiator support upper 6a is transmitted to the apron upper members 4 and fourth reinforcement members 33. The load transmitted to the apron upper members 4 is transmitted to the A-pillars 9, so as to be dispersed to the skeleton members of the vehicle body. On the other hand, the load transmitted to the fourth reinforcement members 33 is transmitted to the fifth reinforcement members 34 through the engine 14, whereas the load transmitted to the fifth reinforcement members 34 is transmitted to the floor tunnel 15, so as to be dispersed to the skeleton members of the vehicle body.

Such a vehicle body front-part structure 31 can also yield effects similar to those of the vehicle body front-part structure 1 in accordance with the first embodiment. In addition, since the fourth reinforcement members 33 and fifth reinforcement members 34 arranged between the radiator support upper 6a and floor tunnel 15 while holding the engine 14 therebetween are provided, the individual members 33, 34 constituting the second radiator support supporting members can be made shorter, by which the structure can endure a higher impact load than before. Also, the degree of freedom in arranging the second radiator support supporting members is improved.

Figure 6:
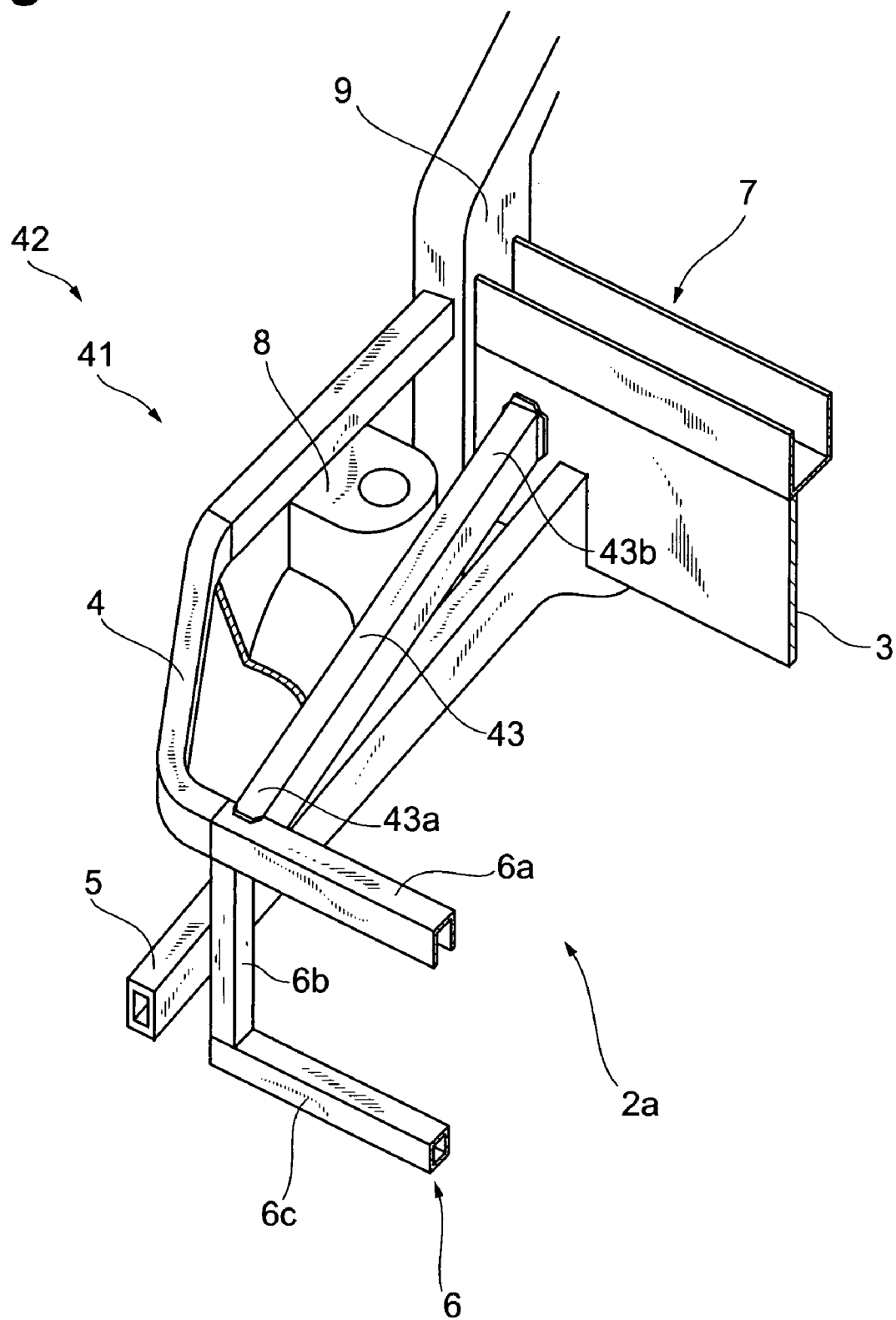
FIG. 6 is a perspective view showing the vehicle body front-part structure in accordance with a fourth embodiment of the present invention from the front side.

The vehicle body front-part structure in accordance with the fourth embodiment of the present invention will now be explained with reference to FIGS. 6 and 7. The vehicle body front-part structure 41 in accordance with the fourth embodiment differs from the vehicle body front-part structure 1 in accordance with the first embodiment in that it uses sixth reinforcement members 43 connecting the radiator support upper 6a and dash panel 3 to each other and dash panel supporting members 44 (see FIG. 7) connecting the portions connecting with the sixth reinforcement members 43 in the dash panel 3 to the cowl part 7 in place of the first reinforcement members 11 connecting the radiator support upper 6a and cowl part 7 to each other. The sixth reinforcement members 43 constitute second radiator support supporting members.

The sixth reinforcement members 43 extend substantially horizontally in the front-to-rear direction of the vehicle 42, and support the radiator support upper 6a from the backside. Specifically, the front-end parts 43a of the second reinforcement members 43 are connected to the inner side of the radiator support upper 6a in the vehicle width direction. On the other hand, the rear-end parts 43b of the sixth reinforcement parts 43 are connected to the front face of the dash panel 3. The sixth reinforcement members 43 may be connected to the radiator support upper 6a and dash panel 3 either by welding or with bolts and the like.

Figure 7:
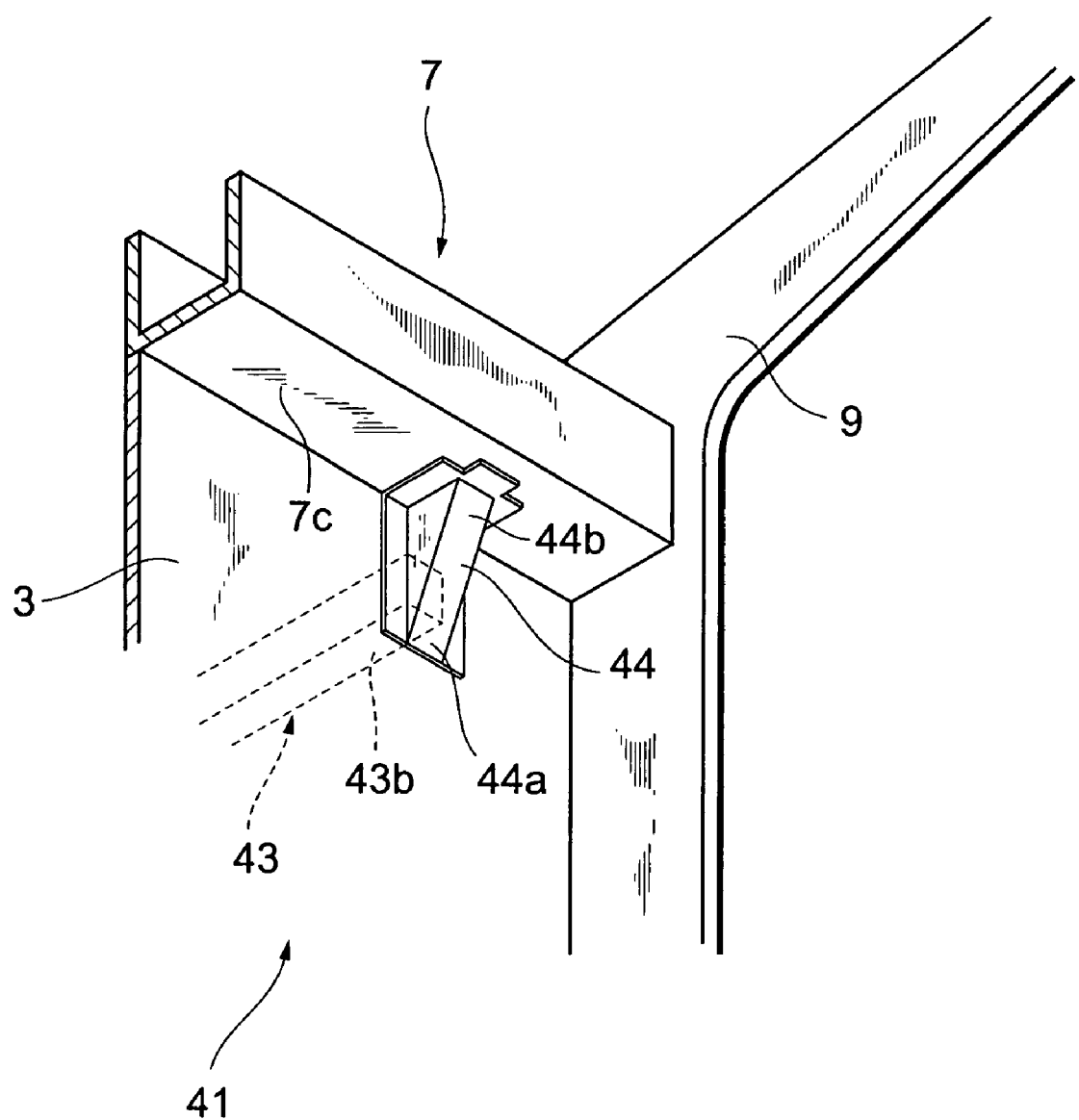
FIG. 7 is a perspective view showing the vehicle body front-part structure of FIG. 6 from the rear side.
Figure 8:
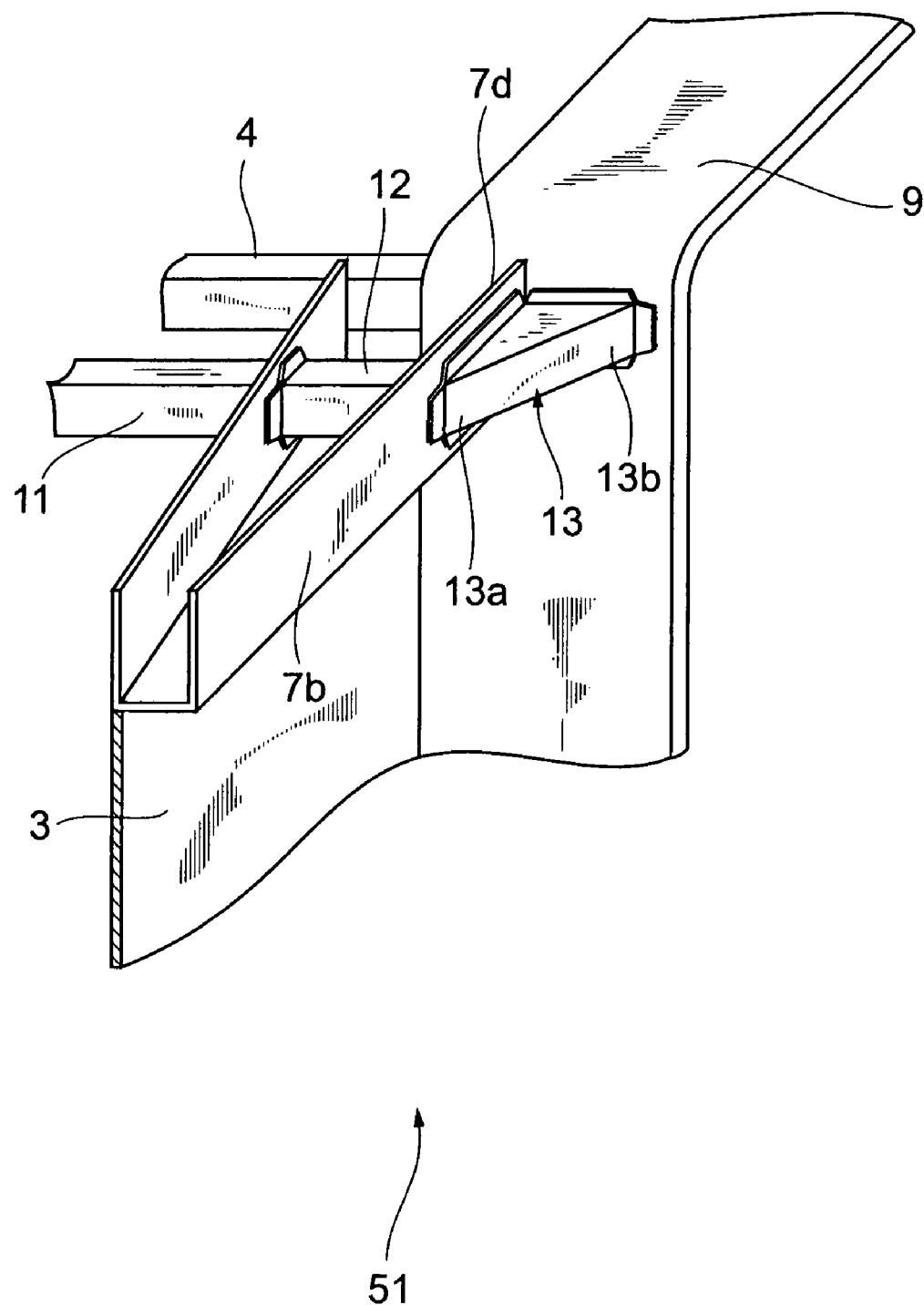
FIG. 8 is a perspective view showing the vehicle body front-part structure in accordance with a fifth embodiment from the rear side.

As shown in FIG. 7, the dash panel supporting members 44 are reinforcement members which extend in the vehicle height direction along the rear face of the dash panel 3 and support the dash panel 3 from the backside. The rear end parts 44a of the dash panel supporting members 44 are connected to the rear end parts 43b of the sixth reinforcement members 43 through the dash panel 3. On the other hand, the upper end parts 44b of the dash panel supporting members 44 are connected to the lower face of the bottom plate 7c of the cowl part 7. The dash panel supporting members 44 may be connected to the dash panel 3 and cowl part 7 either by welding or with bolts and the like.

In thus constructed vehicle body front-part structure 41, when the vehicle 42 collides with an obstacle such as another vehicle on the front side of the vehicle 42, for example, the load F acting on the radiator support upper 6a is transmitted to the apron upper members 4 and sixth reinforcement members 43. The load transmitted to the apron upper members 4 is transmitted to the A-pillars 9, so as to be dispersed to the skeleton members of the vehicle body. On the other hand, the load transmitted to the sixth reinforcement members 43 is transmitted to the dash panel supporting members 44 through the dash panel 3, whereas the load transmitted to the dash panel supporting members 44 is transmitted to the cowl part 7 and A-pillars 9, so as to be dispersed to the skeleton members of the vehicle body. Such a vehicle body front-part structure 41 can also yield effects similar to those of the vehicle body front-part structure 1 in accordance with the first embodiment.

Though the above-mentioned fourth embodiment employs a structure equipped with the dash panel supporting members 44 as one preferred in particular, a structure comprising the sixth reinforcement members 43 alone may also be employed.

The vehicle body front-part structure in accordance with the fifth embodiment of the present invention will now be explained. The vehicle body front-part structure 51 in accordance with the fifth embodiment differs from the vehicle body front-part structure 1 in accordance with the first embodiment in that it comprises cowl supporting members 13 which connect the portions supporting the rear ends of the cowl bulks 12 in the cowl part 7 and the A-pillars 9 to each other.

The cowl supporting members 13 are reinforcement members which are arranged on the rear face (passenger compartment) side of the rear wall 7b of the cowl part 7 and support the end parts 7d in the vehicle width direction of the cowl part 7 from the A-pillar 9 side. The end parts 13a on the cowl part 7 side of the cowl supporting members 13 are connected to the rear end parts 11b of the first reinforcement members 11 through the cowl part 7 and cowl bulks 12. On the other hand, the end parts 13b of the cowl supporting members 13 on the A-pillar 9 side are connected to the surfaces of the A-pillars 9 on the inner (passenger compartment) side in the vehicle width direction. The cowl supporting members 13 may be connected to the cowl part 7 and A-pillars 9 either by welding or with bolts and the like.

In thus constructed vehicle body front-part structure 51, when the vehicle collides with an obstacle such as another vehicle on the front side of the vehicle, for example, the load F acting on the radiator support upper is transmitted to the apron upper members 4 and first reinforcement members 11. The load transmitted to the apron upper members 4 is transmitted to the A-pillars 9, so as to be dispersed to the skeleton members of the vehicle body. On the other hand, the load transmitted to the first reinforcement members 11 is transmitted to the A-pillars 9 and cowl supporting members 13 through the cowl bulks 12 and cowl part 7, whereas the load transmitted to the cowl supporting members 13 is transmitted to the A-pillars 9, so as to be dispersed to the skeleton members of the vehicle body. Such a vehicle body front-part structure can also yield effects similar to those of the vehicle body front-part structure 1 in accordance with the first embodiment. In addition, since the cowl supporting members 13 are provided, the cowl part 7 can be supported further firmly by the A-pillars 9.

The present invention is specifically explained according to its embodiments in the foregoing, but not limited thereto. Though the above-mentioned embodiments employ structures in which the second radiator supporting members are connected to the A-pillars 9 through the cowl part 7 or to the floor tunnel 15, they may be connected to skeleton members of the vehicle body through other reinforcement members or to other skeleton members of the vehicle body such as dash cross members.

INDUSTRIAL APPLICABILITY

Since the impact load on the portion of the radiator support supporting the upper part of the radiator is transmitted to the skeleton of the vehicle body through the first radiator support supporting members and the second radiator support supporting members arranged on the inner side than the first radiator support supporting members in the vehicle width direction, the impact load acting on the front part of the vehicle can be dispersed efficiently in the vehicle body front-part structure in accordance with the present invention. Also, the bending moment acting on the portion of the radiator support supporting the upper part of the radiator is reduced, by which the structure can endure a higher impact load than before.

The invention claimed is:

1. A front-part structure of a vehicle body whose skeleton is partly constructed by a pair of front pillars, arranged on both sides of a vehicle width direction in a vehicle, forming a front part of a passenger compartment of the vehicle;

the front-part structure comprising:
   a radiator support which supports a radiator;
   a pair of first radiator support supporting members which support a portion of the radiator support supporting an upper part of the radiator from both sides in the vehicle width direction and connect the portion to the front pillars;
   a pair second radiator support supporting members which are arranged between the pair of first radiator support supporting members in the vehicle width direction, support the backside portion of the radiator support supporting the upper part of the radiator, and connect the portion to the skeleton of the vehicle body; and
   a cowl part connecting the pair of front pillars to each other;
   wherein a backside end of each of the pair of the second radiator support supporting members is directly connected to the cowl part.

2. The vehicle body front-part structure according to claim 1, comprising a cowl supporting member which connects a portion supporting the second radiator support supporting members in the cowl part to the front pillars.

3. The vehicle body front-part structure according to claim 1, wherein a member of each of the second radiator support supporting members is connected to an additional member arranged between the radiator support and cowl part in a front-to-rear direction of the vehicle.

4. The vehicle body front-part structure according to claim 3, wherein the additional member is a suspension tower which supports a shock absorber used in a suspension of the vehicle body side.

5. The vehicle body front-part structure according to claim 1, wherein the pair of second radiator support supporting members extend linearly.

6. The vehicle body front-part structure according to claim 1, further comprising:
   a suspension tower which supports a shock absorber used in a suspension of the vehicle body side,
   wherein a first part of the second radiator support supporting member is connected to the radiator support and the suspension tower, and a second part of the second radiator support supporting member is connected to the suspension tower and the cowl part, and wherein positions, in a height direction of the vehicle, of the first part and second part are substantially the same.

7. The vehicle body front-part structure according to claim 1,
wherein the cowl part has a front side wall and a back side wall both extending in a height direction of the vehicle, and
wherein the second radiator support supporting members comprise:
a first reinforcement member supporting a back side of the portion of the radiator support, and connected to the front side wall of the cowl part, and
a cowl bulk positioned behind a back side end of the first reinforcement member, connecting the front side wall and the back side wall of the cowl part.

8. The vehicle body front-part structure according to claim 1, wherein the pair of second radiator support supporting member connect to a rear-facing side of the radiator support.

9. A front-part structure of a vehicle body whose skeleton is partly constructed by a pair of front pillars, arranged on both sides of a vehicle width direction in a vehicle, forming a front part of a passenger compartment of the vehicle;
the front-part structure comprising:
a radiator support which supports a radiator;
a pair of first radiator support supporting members which support a portion of the radiator support supporting an upper part of the radiator from both sides in the vehicle width direction and connect the portion to the front pillars;
a pair second radiator support supporting members which are arranged between the pair of first radiator support supporting members in the vehicle width direction, support the backside portion of the radiator support supporting the upper part of the radiator, and connect the portion to the skeleton of the vehicle body;
a cowl part which connects the pair of front pillars to each other; and
a dash panel, connected to the cowl part, constituting a front wall of the passenger compartment;
wherein a backside end of each of the pair of the second radiator support supporting members is directly connected to the dash panel or to the cowl part.

10. The vehicle body front-part structure according to claim 9, comprising a dash panel supporting member which connects a portion connecting the second radiator support supporting members in the dash panel to the cowl part.

11. A front-part structure of a vehicle body whose skeleton is partly constructed by a pair of front pillars, arranged on both sides of a vehicle width direction in a vehicle, forming a front part of a passenger compartment of the vehicle; and a floor tunnel, formed in a lower face of the passenger compartment, extending in a front-to-rear direction of the vehicle;
the front-part structure comprising:
a radiator support which supports a radiator;
a pair of first radiator support supporting members which support a portion of the radiator support supporting an upper part of the radiator from both sides in the vehicle width direction and connect the portion to the front pillars; and
a pair second radiator support supporting members which are arranged between the pair of first radiator support supporting members in the vehicle width direction and between the portion of the radiator support supporting the upper part of the radiator and the floor tunnel in the front-to-rear direction of the vehicle;
wherein the second radiator support supporting members are arranged such as to hold an engine therebetween; and
wherein a backside end of each of the pair of second radiator support supporting members is connected directly to the floor tunnel.

12. The vehicle body front-part structure according to claim 11, wherein the pair of second radiator support supporting member connect to a rear-facing side of the radiator support.

* * * * *